(No Model.) 6 Sheets—Sheet 1.

F. C. VIBERT.
COMBINED DRILL, FERTILIZER SOWER, AND CHECK ROW MARKER.

No. 358,369. Patented Feb. 22, 1887.

(No Model.)  6 Sheets—Sheet 2.
F. C. VIBERT.
COMBINED DRILL, FERTILIZER SOWER, AND CHECK ROW MARKER.
No. 358,369.  Patented Feb. 22, 1887.

Witnesses
Frank H. Pierpont
N. L. Rickard

Inventor
Francis C. Vibert
Attorney
Albert H. Walker (No Model.) 6 Sheets—Sheet 5.
F. C. VIBERT.
COMBINED DRILL, FERTILIZER SOWER, AND CHECK ROW MARKER.
No. 358,369. Patented Feb. 22, 1887.

Witnesses
Frank H. Pierpont
H. L. Reckard

Inventor
Francis C. Vibert
Attorney
Albert H. Walker (No Model.) 6 Sheets—Sheet 6.

F. C. VIBERT.

COMBINED DRILL, FERTILIZER SOWER, AND CHECK ROW MARKER.

No. 358,369. Patented Feb. 22, 1887.

UNITED STATES PATENT OFFICE.

FRANCIS C. VIBERT, OF EAST HARTFORD, CONNECTICUT.

COMBINED DRILL, FERTILIZER-SOWER, AND CHECK-ROW MARKER.

SPECIFICATION forming part of Letters Patent No. 358,369, dated February 22, 1887.

Application filed October 11, 1886. Serial No. 215,849. (No model.)

*To all whom it may concern:*

Be it known that I, FRANCIS C. VIBERT, of East Hartford, Connecticut, have invented a Combined Drill, Fertilizer-Sower, and Check-Row Marker, of which the following description and claims constitute the specification, and which is illustrated by the accompanying six sheets of drawings.

This machine is adapted to pulverize commercial fertilizers and to distribute the same in parallel rows, and to cover the same more or less deeply with earth and to make a row for subsequent fertilization, and also to leave marks for hills to guide the planter with his seed.

Figure 1:
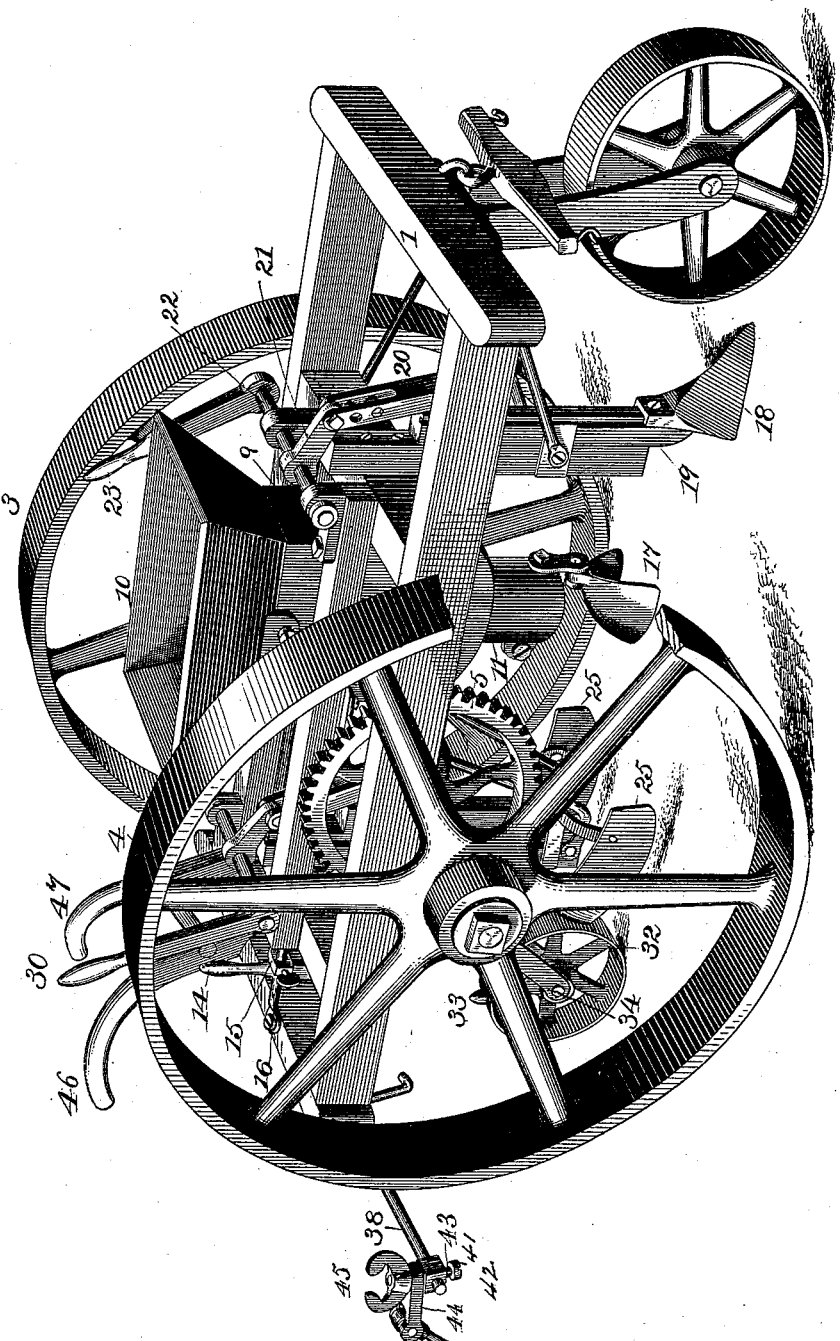
Figure 2:
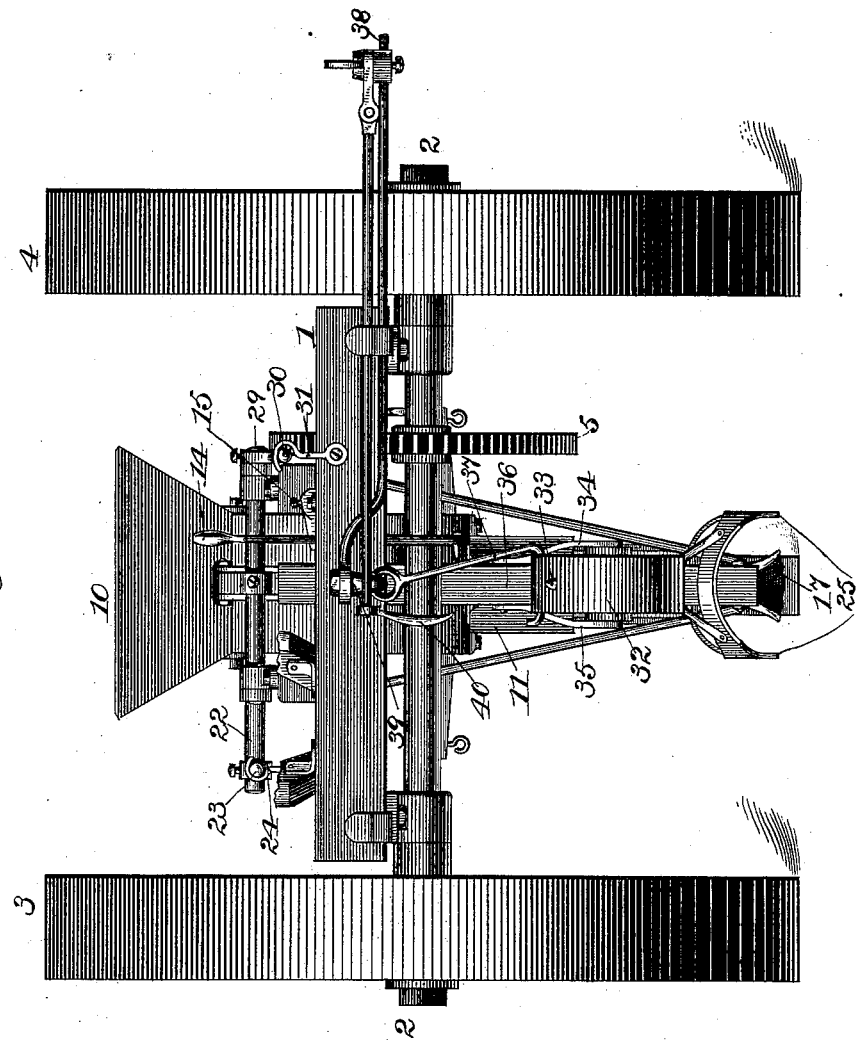
Figure 3:
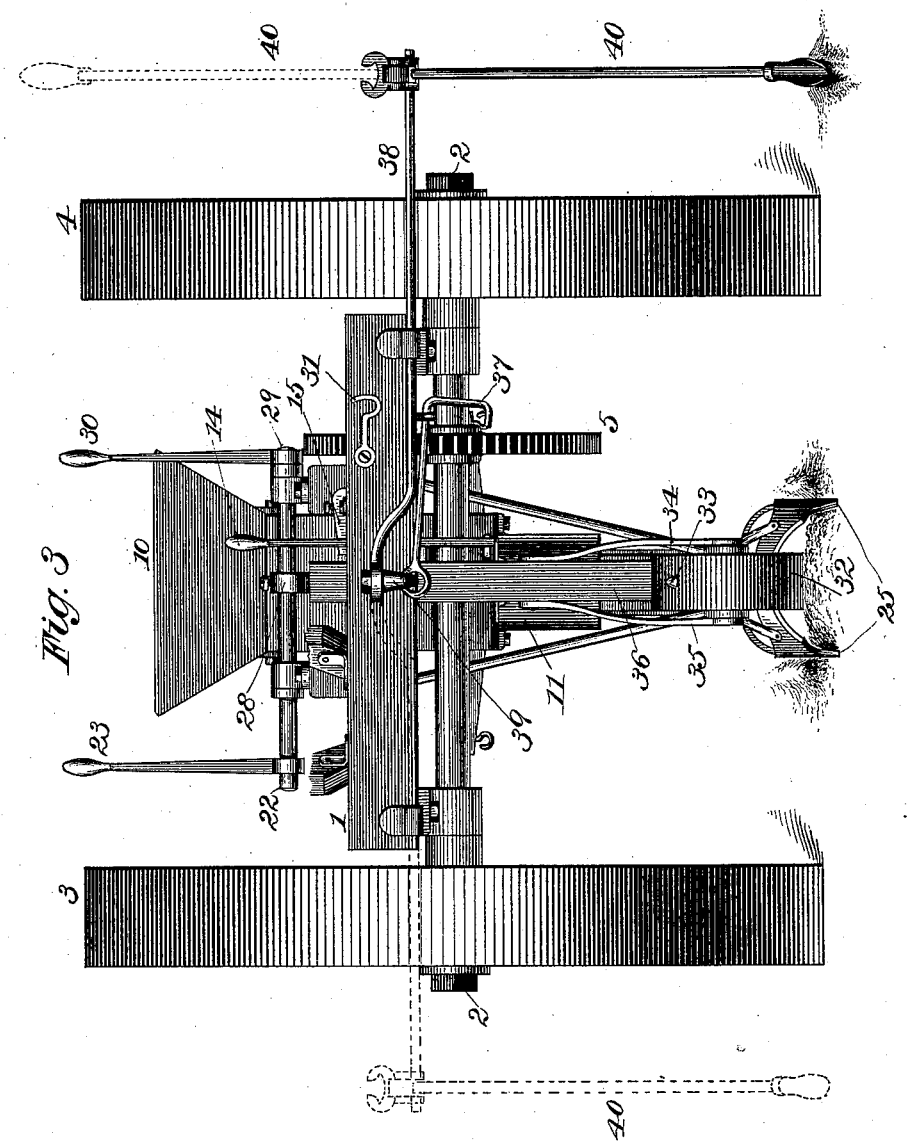
Figure 4:
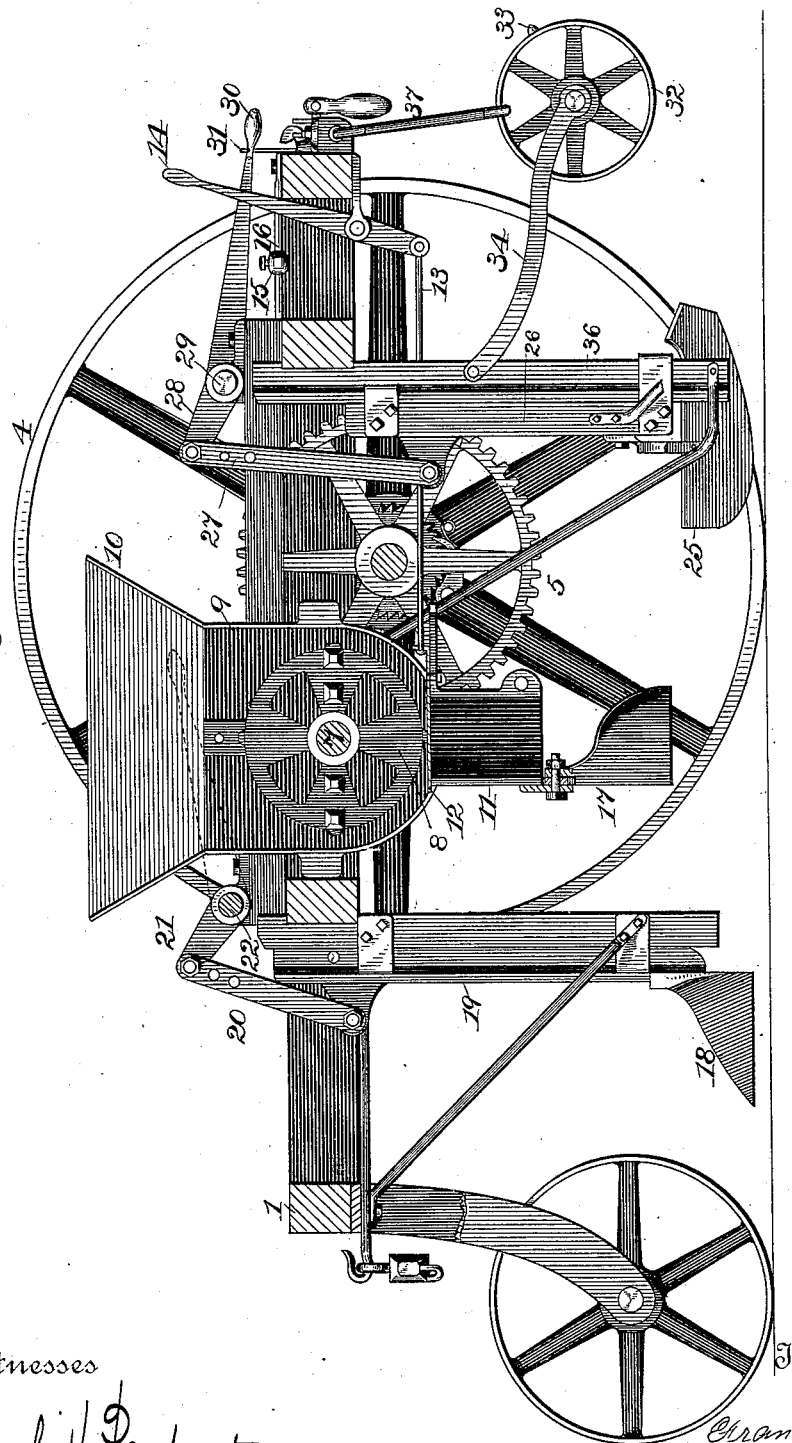
Figure 5:
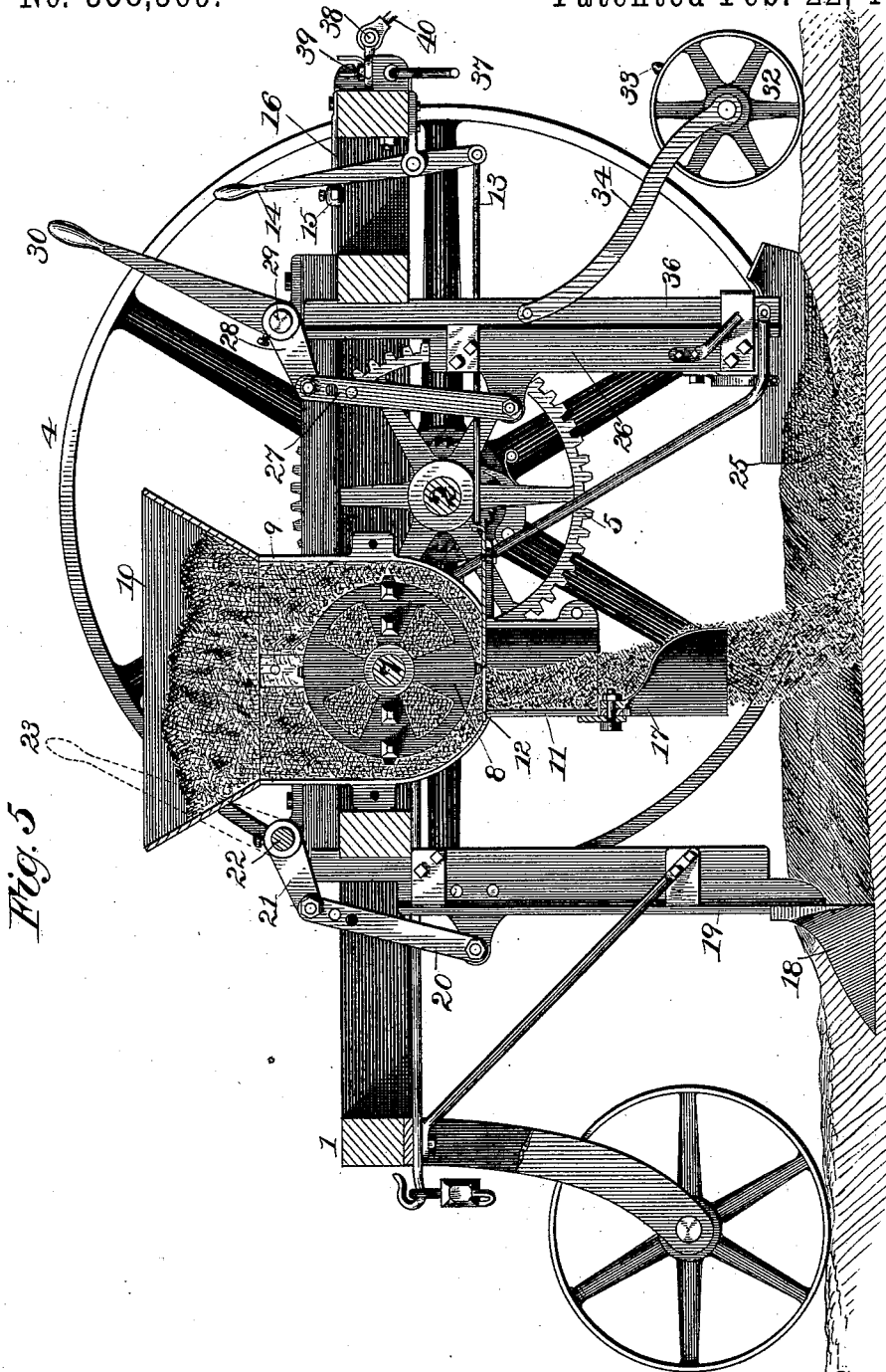
Figure 6:
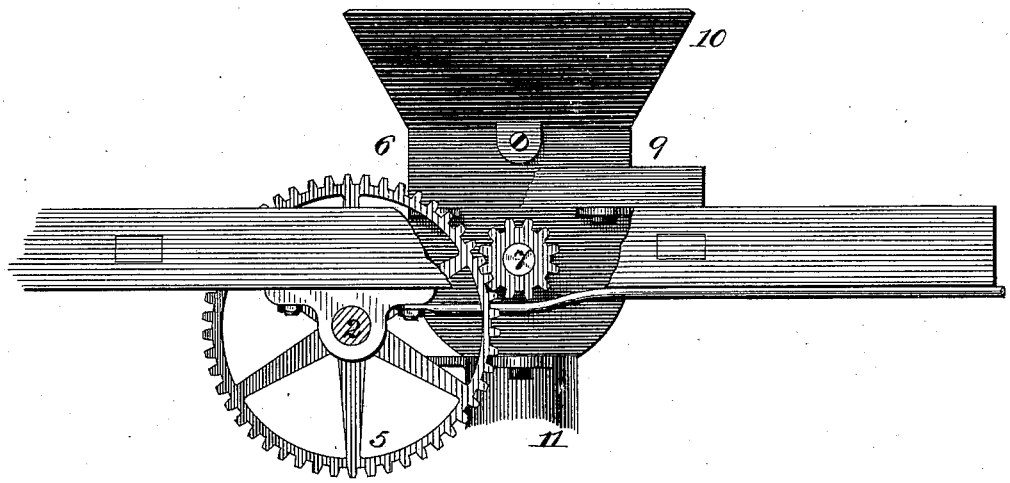
Figure 7:
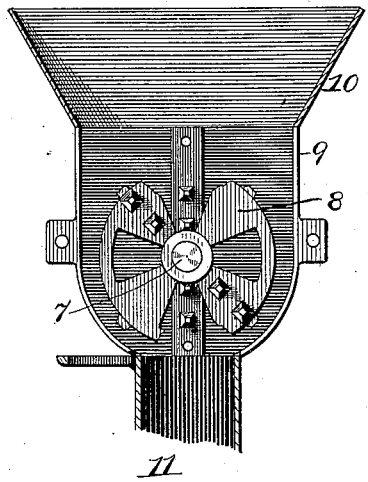

Figure 1 is a perspective view of the machine. Fig. 2 is a rear view of the machine when adjusted to be drawn from place to place without operating. Fig. 3 is a rear view of the machine when operating. Fig. 4 is a longitudinal central vertical section of the machine of Fig. 2, while Fig. 5 is a like section of the machine of Fig. 3. Fig. 6 is a side view of certain parts of the machine not fully shown in Fig. 1 on account of certain other intervening parts. Fig. 7 is a central vertical longitudinal section of the hopper and pulverizing-box.

The numeral 1 indicates the frame of the machine, while 2 denotes the shaft which mainly supports it. The wheels 3 and 4 are so attached to the ends of the shaft 2 as to be capable of backward revolution thereon; but each wheel is provided with a ratchet, so that when either of the wheels turns forward it causes the shaft also to revolve. The gear 5 is keyed to the shaft 2 and meshes with the pinion 6, which turns the shaft 7. The pulverizer 8 is keyed to the shaft 7, and is provided with teeth on its sides and also on its periphery. The pulverizing-box 9 incloses the pulverizer, and is preferably provided on its inner sides with teeth opposite the spaces between the side teeth of the pulverizer. The hopper 10 surmounts the pulverizing-box, and the tube 11 extends from the open bottom of that box toward the ground, the slide-valve 12, worked by the rod 13 and the lever 14, being interposed between the box and the tube. The adjustable stop 15 on the rod 16 regulates the throw of the valve 12. The spreader 17 consists of two adjustable wings, and is placed below the lower end of the tube 11. The plow 18 is fixed to the lower end of the slide 19, and that slide may be raised by the pitman 20, the arm 21, the rock-shaft 22, and the arm 23, and may be held in its raised position by the hook 24, engaging with the latter arm. The coverer 25 is fixed to the lower end of the slide 26, and that slide may be raised by the pitman 27, the arm 28, the rock-shaft 29, and the arm 30, and may be held in its raised position by the hook 31, engaging with the latter arm. The marking-roller 32 is provided with the marker 33 and runs in the rear of the coverer. It is pivoted between the lower ends of the arms 34 and 35, and the upper ends of those arms are pivoted to the downward-extending post 36. The marking-roller may be suspended, when not in use, by the hook 37, and other marking-rollers of other diameters may be used in place of the one indicated in the drawings whenever it is desired to mark for hills of different distances apart. The arm 38, by means of the set-screw 41, which is tapped into the block 42, extends in either direction laterally from the stud 39, and carries the marker 40 near its outer end, when that marker is at work, and when it is idle that marker may be folded into the position shown in Fig. 2.

The marker 40 may be adjusted at different positions on the rod 38, so as to mark the rows at different distances apart. The stud 43 extends upward from the block 42 through the arm 44, and is tapped into the binding thumb-nut 45, and the arm 44 has the arm of the marker 40 pivoted to its backward end.

The mode of operation is as follows: The hopper being kept supplied with any of the fertilizers of commerce, of which so-called "Pacific guano" is a representative, and the parts being in the positions shown in Figs. 3 and 5, the machine is drawn by a horse or other suitable power, and is guided by a person who walks behind and holds the handles 46 and 47. The plow then turns up the soil in both directions, and the pulverizer comminutes the fertilizer, and the fertilizer passes through the valve and falls upon the upper surfaces of the spreader, whence it is deflected more or less, according to the openness of the spreader-wings, and is scattered in the furrow which is made by the plow. The coverer follows and draws the two sides of the furrow together over the fertilizer, and the marking-wheel presses lightly upon the soil thus replaced and leaves the impression of the marker 33 at uniform intervals along the line of the buried fertilizer to guide the planter when he puts the seed into the ground. At the same time the marker 40 marks a parallel line, to be followed by the plow in the next passage across the field. At the end of each row the marker 40 is shifted to the other side of the machine, preparatory to the return parallel passage of the machine across the area being fertilized. This shifting is accomplished by loosening the thumb-nut 45 and giving the arm 44 half a turn upon the stud 43, and by giving the arm 38 half a turn upon the stud 39. The depths at which the plow and the coverer may work are adjustable by means of the different holes in the upper ends of the pitmen 20 and 27, respectively, because the arms 21 and 28, respectively, rest upon the upper ends of the two downward-projecting posts whenever the plow and the coverer are lowered to their work.

The pulverizer may be dispensed with where the fertilizer is already fine enough, and the spreader 17 may be dispensed with at any time and the fertilizer be allowed to fall into the bottom of the furrow. Other forms of valves and other forms of ratchets may also be used in place of those indicated in the drawings, and, indeed, many changes may be made in the details of the machine without affecting its essential character.

I claim as my invention—

1. The combination of the pulverizer-disk 8, provided with a diametrical row of teeth on each side and with a series of teeth on its periphery, and the pulverizing-box 9, provided on its inner sides with teeth opposite the spaces between the side teeth of the pulverizer, all substantially as described.

2. The spreader 17, consisting of two wings pivoted to each other so as to be adjustable to variant degrees of mutual divergence, substantially as indicated.

3. The combination of the plow 18, the slide 19, the pitman 20, the arm 21, the shaft 22, and the arm 23, all substantially as shown and described.

4. The coverer 25, rigidly fixed to the lower end of the slide 26, in combination with the pitman 27, the arm 28, the shaft 29, and the arm 30, all substantially as shown and described.

5. The combination of the arm 38, the set-screw 41, the block 42, the stud 43, the arm 44, the thumb-nut 45, and the marker 40, all substantially as shown and described.

FRANCIS C. VIBERT.

Witnesses:
ALBERT H. WALKER,
JOHN HENRY BROCKLESBY.